(12) United States Patent
Yamaguchi et al.

(10) Patent No.: US 11,297,623 B2
(45) Date of Patent: Apr. 5, 2022

(54) SYSTEM AND METHOD FOR AIR-TO-GROUND COMMUNICATION INVOLVING AN AIRCRAFT

(71) Applicant: Panasonic Intellectual Property Management Co., Ltd., Osaka (JP)

(72) Inventors: Takahiro Yamaguchi, Osaka (JP); Ryota Miyanaka, Osaka (JP); Shutai Okamura, Osaka (JP); Takeshi Hatakeyama, Osaka (JP); Tsutomu Uenoyama, Osaka (JP); Masaaki Higashida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 16/640,253

(22) PCT Filed: Feb. 13, 2018

(86) PCT No.: PCT/JP2018/004827
§ 371 (c)(1),
(2) Date: Feb. 19, 2020

(87) PCT Pub. No.: WO2019/049390
PCT Pub. Date: Mar. 14, 2019

(65) Prior Publication Data
US 2020/0383102 A1   Dec. 3, 2020

Related U.S. Application Data

(60) Provisional application No. 62/555,649, filed on Sep. 8, 2017.

(51) Int. Cl.
*H04W 72/04* (2009.01)
*H04W 4/42* (2018.01)
(Continued)

(52) U.S. Cl.
CPC ...... *H04W 72/048* (2013.01); *H04B 7/18506* (2013.01); *H04W 4/42* (2018.02);
(Continued)

(58) Field of Classification Search
CPC ....... H04W 72/04; H04W 4/42; H04W 64/00; H04W 72/02; H04W 72/044;
(Continued)

(56) References Cited

U.S. PATENT DOCUMENTS 5,123,112 A * 6/1992 Choate ........................ 370/95.1
5,212,804 A * 5/1993 Choate ........................ 455/33.1
(Continued)

FOREIGN PATENT DOCUMENTS

JP    2004-242059    8/2004
JP    2011-44917     3/2011
(Continued)

OTHER PUBLICATIONS

International Search Report dated May 15, 2018 in International (PCT) Application No. PCT/JP2018/004827.
(Continued)

*Primary Examiner* — Meless N Zewdu
(74) *Attorney, Agent, or Firm* — Wenderoth, Lind & Ponack, L.L.P.

(57) ABSTRACT

The communication device is installed in an aircraft and is capable of radio communication with a base station on the ground. The communication device comprises a transmitter, a receiver, and a controller. The controller acquires location information of the aircraft at a predetermined time, and communicates with the base station using an allocation pattern of communication resources according to the location information of the aircraft.

6 Claims, 11 Drawing Sheets

(51) Int. Cl.
*H04B 7/185* (2006.01)
*H04W 64/00* (2009.01)
*H04W 72/02* (2009.01)
*H04W 88/02* (2009.01)
*H04W 88/08* (2009.01)

(52) U.S. Cl.
CPC ........... *H04W 64/00* (2013.01); *H04W 72/02* (2013.01); *H04W 72/044* (2013.01); *H04W 88/02* (2013.01); *H04W 88/08* (2013.01)

(58) Field of Classification Search
CPC ..... H04W 84/06; H04W 88/00; H04W 88/02; H04W 88/08; H04W 72/048; H04W 4/30; H04W 36/0009; H04W 4/08; H04W 8/186; H04W 4/029; H04W 4/02; H04W 4/50; H04W 8/14; H04W 8/08; H04W 28/20; H04W 28/18; H04W 28/26; H04W 64/003; H04W 64/006; H04W 72/00; H04W 72/0406; H04W 72/0426; H04W 74/002; H04W 84/005; H04B 7/185; H04B 7/18506; H04B 1/713; H04B 7/18502; H04B 7/18504; H04B 10/112; H04B 10/1123; H04B 1/7143; H04B 17/382; H04B 7/18508; H04L 27/26; H04L 27/2601; H04L 27/2666; G08G 5/0004; G08G 5/0008; G08G 5/0013

See application file for complete search history.

(56) References Cited

U.S. PATENT DOCUMENTS

| | | | | |
|---|---|---|---|---|
| 5,878,346 | A * | 3/1999 | Ray et al. | 455/431 |
| 6,308,045 | B1 | 10/2001 | Wright et al. | |
| 6,628,941 | B2 * | 9/2003 | Knoblach et al. | 455/431 |
| 7,162,235 | B1 * | 1/2007 | Gilbert | 455/431 |
| 7,751,815 | B2 * | 7/2010 | McKenna et al. | 455/431 |
| 8,145,208 | B2 * | 3/2012 | Chari et al. | 455/431 |
| 8,442,519 | B2 * | 5/2013 | Cruz et al. | 455/431 |
| 8,914,022 | B2 * | 12/2014 | Konstanic et al. | H04B 7/18506 |
| 9,306,657 | B2 * | 4/2016 | de La Chapelle et al. | H04B 7/18506 |
| 10,848,234 | B2 * | 11/2020 | Axmon et al. | H04B 7/18506 |
| 2004/0253951 | A1 * | 12/2004 | Chang et al. | 455/431 |
| 2006/0009262 | A1 * | 1/2006 | Hamm | 455/456.1 |
| 2007/0021117 | A1 * | 1/2007 | McKenna et al. | 455/431 |
| 2008/0102814 | A1 * | 5/2008 | Chari et al. | 455/424 |
| 2008/0305762 | A1 * | 12/2008 | Malosh | 455/404.1 |
| 2011/0182230 | A1 * | 7/2011 | Ohm et al. | 370/315 |
| 2013/0046422 | A1 * | 2/2013 | Cabos | 701/120 |
| 2014/0269572 | A1 * | 9/2014 | Li et al. | H04W 72/0453 |
| 2015/0215935 | A1 | 7/2015 | Taira | |
| 2015/0263773 | A1 | 9/2015 | Suzuki et al. | |
| 2016/0156406 | A1 * | 6/2016 | Frolov et al. | H04B 7/18504 |
| 2017/0272131 | A1 * | 9/2017 | Ananth et al. | H04B 7/0408 |
| 2017/0366250 | A1 * | 12/2017 | Ovens et al. | H04B 7/18506 |

FOREIGN PATENT DOCUMENTS

| | | |
|---|---|---|
| JP | WO2014/045401 | 3/2014 |
| JP | WO2014/045402 | 3/2014 |
| JP | 2014-207626 | 10/2014 |
| JP | 2016-127356 | 7/2016 |
| JP | 2017-523742 | 8/2017 |
| WO | 2015/181045 | 12/2015 |

OTHER PUBLICATIONS

Jun Kitaori et al., "BER characteristics of aeronautical high speed datalink LDACS", The Institute of Electronics, Information and Communication Engineers, Dec. 7, 2012, vol. 112, No. 360, pp. 37-42 (with English abstract).

* cited by examiner

FIG. 5

| Location information | Switching pattern |
|---|---|
| A11-1 | R1-1 |
| A11-2 | R1-2 |
| A12-1 | R2-1 |
| A12-2 | R2-2 |
| ... | ... |

T1

SYSTEM AND METHOD FOR AIR-TO-GROUND COMMUNICATION INVOLVING AN AIRCRAFT

TECHNICAL FIELD

The present disclosure relates to an air-to-ground communication system in a moving body such as an aircraft.

BACKGROUND ART

In recent years, a moving body such as an aircraft is equipped with a communication device and communicates with a communication satellite. A short-distance radio communication system such as Wi-Fi or Bluetooth (registered trademark) is mounted as a means for performing radio communication in the interior of the moving body. Therefore, communication environment improvements have been promoted for a wider range of application such as personal applications directed at passengers of moving bodies and business applications directed at companies (airlines).

Communication with a communication satellite requires the mounting in the moving body of a large and heavy antenna and communication device, which causes a burden for the operation company in respect of size, weight and cost. For example, a satellite communication system is easily adopted in cases of long distances and long flight times such as on international routes. However, in cases of short distances and short flight times such as on domestic routes, adoption of such a satellite communication system tends to be hindered by cost.

An air-to-ground communication system is a system in which a base station installed on the ground and a communication device mounted in a moving body directly communicate. Compared to satellite communication, the size and weight of the antenna and communication device in an air-to-ground communication system are smaller, which is suited to movements of short distance and short flight time such as on domestic routes. Moreover, an air-to-ground communication system is easy to retrofit in a moving body already in service. Therefore, there is a need for installation of air-to ground communication systems.

SUMMARY

Problems to be Solved by Invention

The present disclosure describes configurations and operations in particular of a communication device installed in a moving body such as an aircraft or of a communication device installed in a base station in order to solve various problems in air-to-ground communication, in a case of the moving body using an air-to-ground communication system,

Means for Solving the Problems

A communication device according to the present disclosure is a communication device configured to be installed in an aircraft and perform radio communication with a base station on the ground, the communication device comprising a transmitter, a receiver, and a controller. The controller is configured to acquire location information of the aircraft at a predetermined time and communicate with the base station using an allocation pattern of communication resources according to the location information of the aircraft.

Another communication device according to the present disclosure is a communication device configured to be installed in a base station on the ground and perform radio communication with a plurality of aircrafts, the communication device comprising a transmitter, a receiver, and a controller. The controller is configured to acquire communication traffic determination information for determining use of radio communication in each of the aircrafts, determine allocation patterns of communication resources for the plurality of aircrafts according to the communication traffic determination information, and communicate with the plurality of aircrafts using the allocation patterns.

BRIEF DESCRIPTION OF DRAWINGS

FIG. 5 shows a table including location information and allocation patterns of communication resources in Embodiment 1.

DETAILED DESCRIPTION

Hereinafter, embodiments will be described with reference to the drawings whenever appropriate. In particular, the following description will describe as an example the case of the moving body being a commercial aircraft. The aircraft may be another aircraft, for example, a helicopter, an airship, or any other aircraft capable of flying in the air.

Embodiment 1

When performing air-to-ground communication using a frequency band with low attenuation such as a VHF band, the aircraft receives radio signals from a number of base stations.

Figure 1:
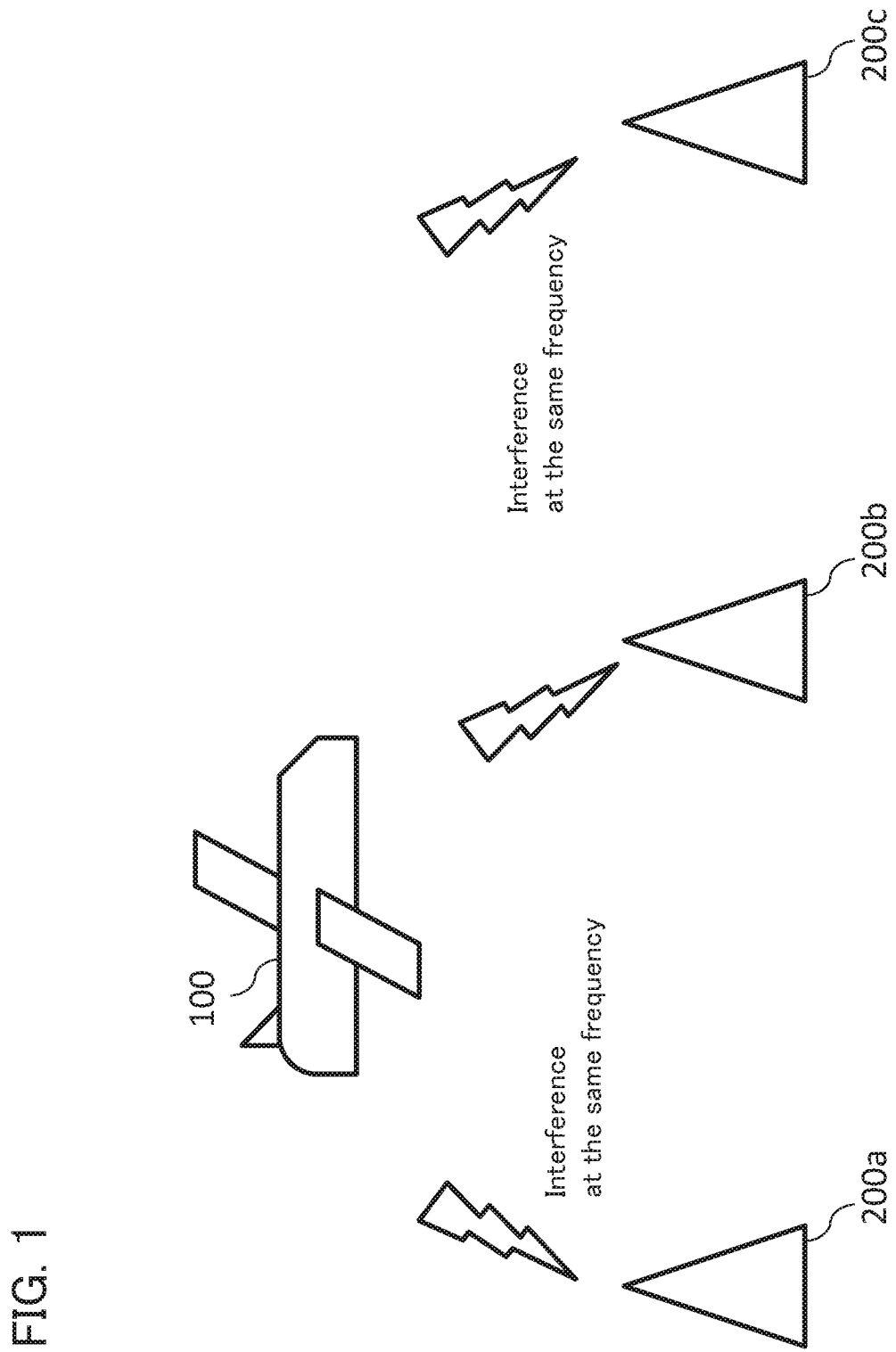
FIG. 1 schematically shows an aircraft performing radio communication with a base station on the ground.

For example, in LTE (Long Term Evolution), two or more base stations 200 (200a to 200c) operate at the same frequency. Therefore, as illustrated in FIG. 1, when the aircraft 100 is communicating with the base station 200a, signals from the adjacent base stations 200b and 200c cause co-channel interference (CCI: Co-Channel Interference). As a result, there is a problem that communication quality between the aircraft 100 and the base station 200a deteriorates.

1-1. Configuration

<General Configuration>

In order to reduce the effect of CCI, the aircraft 100 and the base station 200a in Embodiment 1 perform communication using a frequency hopping scheme in which transmission is performed while switching the frequency at which information is transmitted. By changing a hopping pattern for each combination of the aircraft 100 and the base station 200, it is possible to randomize CCI generated at specific time and frequency. Furthermore, by applying an error-correcting code having a length longer than the minimum time/frequency unit for switching the frequency, the effect of randomized CCI can be reduced with the gain of the error-correcting code.

Figure 2:
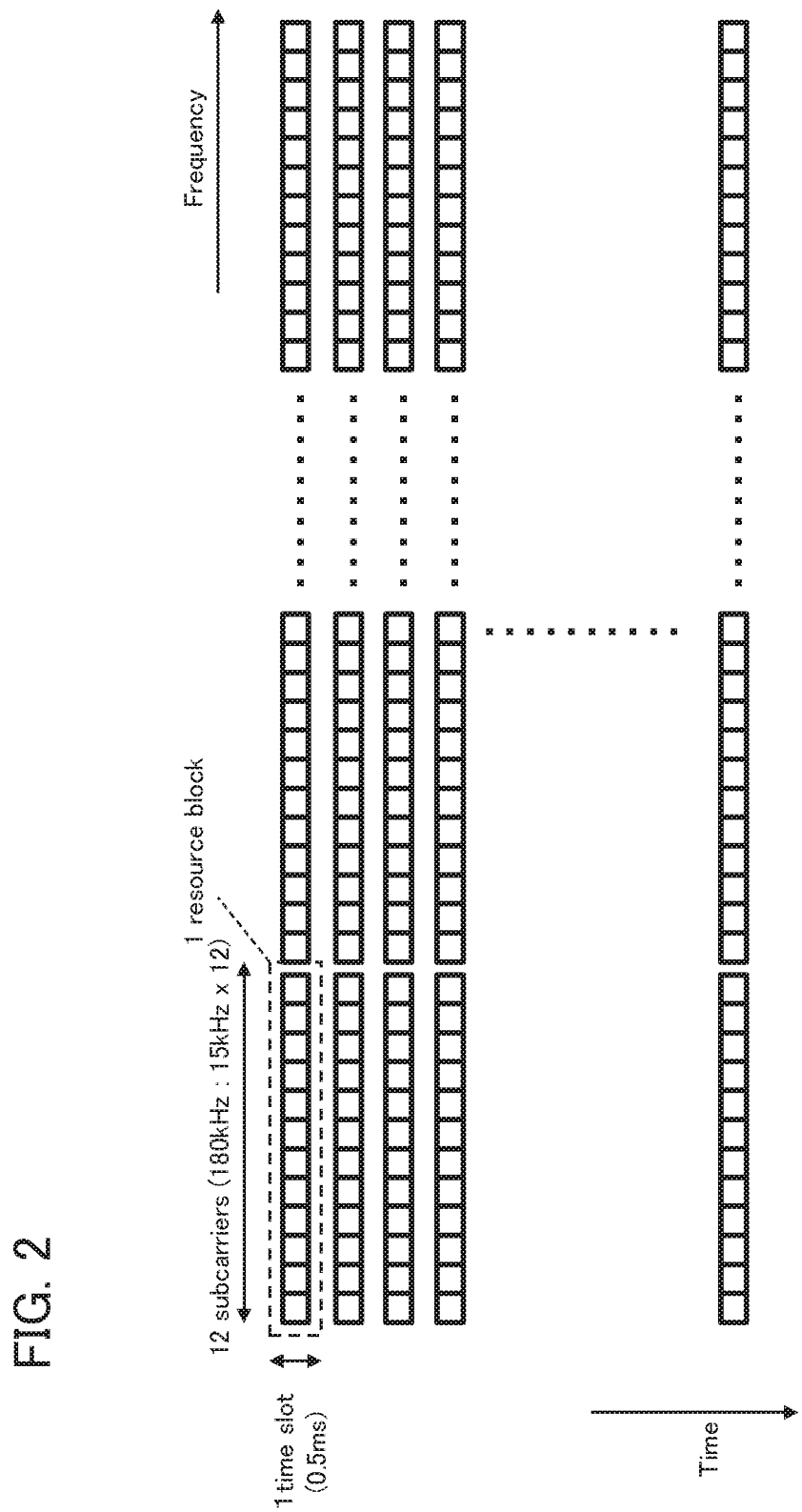
FIG. 2 shows an example of resource blocks.

As illustrated in FIG. 2, in LTE, information is transmitted and received in resource blocks having a predetermined frequency width and a predetermined time slot. In the example illustrated in FIG. 2, a single resource block is configured by 12 subcarriers (180 kHz: 15 kHz×12) and a time slot of 0.5 ins. On the frequency axis, the resource is divided by subcarriers in OFDMA (Orthogonal Frequency-Division Multiple Access).

In this embodiment, radio communication is performed between communication devices using a VHF (Very High Frequency) band. Note that a band other than a VHF band may be used. On the other hand, each communication device has a converter for converting a frequency into an LTE frequency band, and performs modulation and demodulation using the LTE element technology like OFDMA described above. Frequency modulation may not be performed when the frequency processed in the communication device is the same as the frequency used for communication between the communication devices.

<System Configuration>

Figure 3:
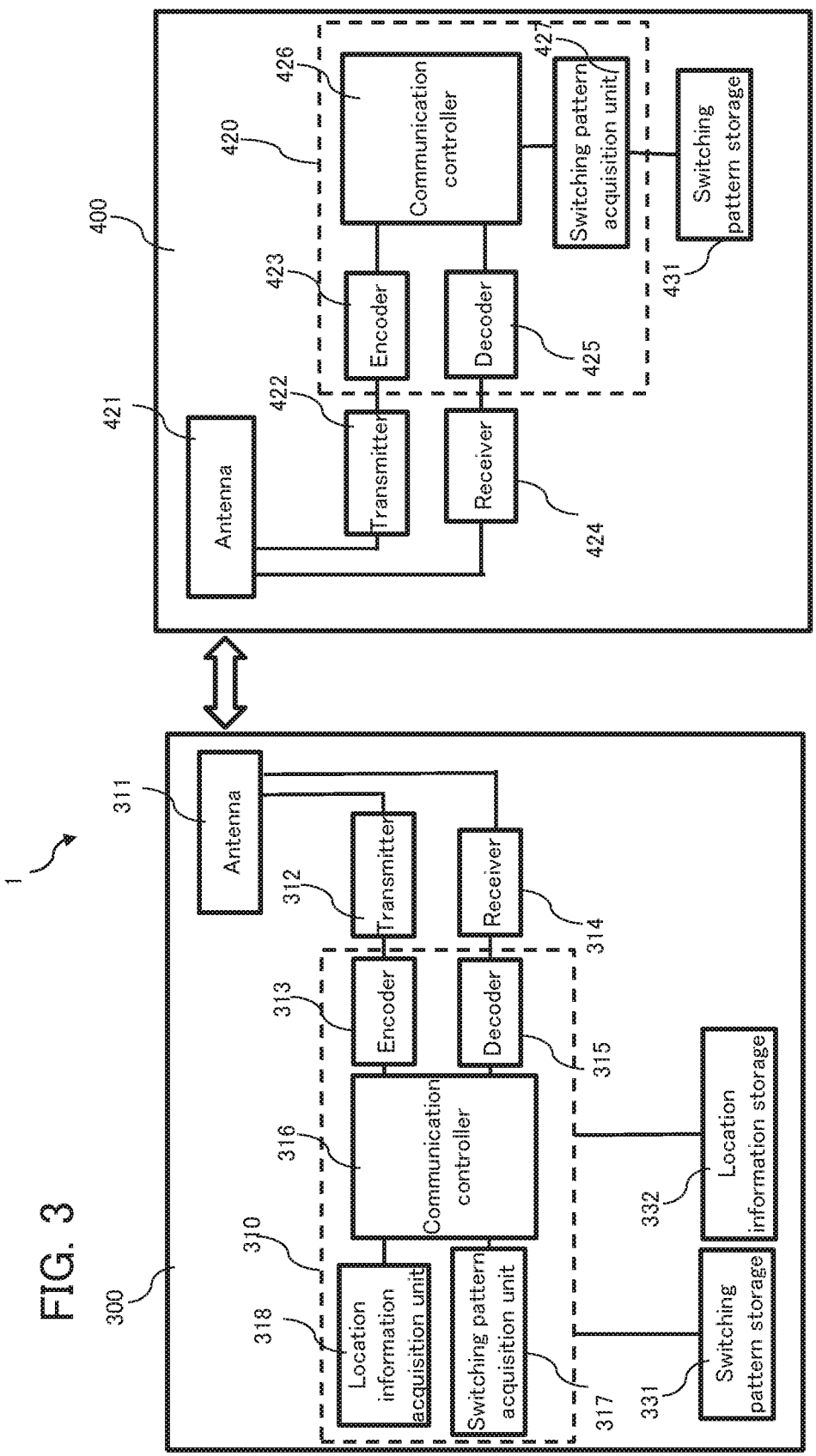
FIG. 3 shows a configuration of a communication system according to Embodiment 1.

FIG. 3 shows a configuration of the communication system 1 according to the present embodiment. The communication system 1 comprises a communication device 300 installed in the aircraft 100 and a communication device 400 installed at the base station 200.

The on-aircraft communication device 300 comprises an antenna 311, a transmitter 312, a receiver 314, and a processor 310. The processor 310 is a processor or circuitry such as a DSP or a CPU, and by executing a predetermined program, implements the functions of an encoder 313, a decoder 315, a communication controller 316, a switching pattern acquisition unit 317, and a location information acquisition unit 318. The communication device 300 also comprises a switching pattern storage 331 and a location information storage 332 provided in a memory.

The antenna 311 transmits and receives data.

The transmitter 312 converts encoded data into an analog signal and transmits the analog signal through the antenna 311.

The encoder 313 encodes data to be transmitted to the on-base-station communication device 400.

The receiver 314 receives data received from the on-base-station communication device 400 through the antenna 311 and converts the data into a digital signal.

The decoder 315 decodes data.

The communication controller 316 controls communication of the entire communication device 300, and is connected to the encoder 313 and the decoder 315.

The switching pattern acquisition unit 317 acquires a switching pattern, which is an example of an allocation pattern of a communication resource, from the switching pattern storage 331.

The switching pattern is a hopping pattern that is switched by frequency hopping, as described later.

The location information acquisition unit 318 acquires location information indicating the current location of the aircraft 100 from the location information storage 332.

The switching pattern storage 331 stores the switching pattern. The location information storage stores the location information.

Note that the switching pattern and the location information need not be stored in the communication device 300. These pieces of information may be received and obtained from another device. Further, the location information may be obtained from a flight schedule of the aircraft, or may be location information dynamically acquired by the aircraft using GPS communication.

The on-base-station communication device 400 comprises an antenna 421, a transmitter 422, a receiver 424, and a processor 420. The processor 420 is a processor or circuitry such as a DSP or a CPU, and by executing a predetermined program, implements the functions of an encoder 423, a decoder 425, a communication controller 426, and a switching pattern acquisition unit 427.

The antenna 421 transmits and receives data.

The transmitter 422 converts encoded data into an analog signal and transmits the analog signal through the antenna 421.

The encoder 423 encodes data to be transmitted to the on-aircraft communication device 300.

The receiver 424 receives data from the on-aircraft communication device 300 through the antenna 421 and converts the data into a digital signal.

The decoder 425 decodes data.

The communication controller 426 controls communication of the entire communication device 400, and is connected to the encoder 423 and the decoder 425.

The switching pattern acquisition unit 427 acquires a switching pattern from the switching pattern storage 431. The switching pattern is a hopping pattern that is switched by frequency hopping, as described later, and is the same as that held by the on-aircraft communication device 300.

The on-aircraft communication device 300 and the on-base-station communication device 400 hold and use a common switching pattern for communicating with each other.

<Overview of Frequency Hopping>

Now a method of frequency hopping using a resource block as a minimum unit will be described. The frequency hopping is an LTE wireless access method used by the aircraft 100 and the base station 200.

Figure 4:
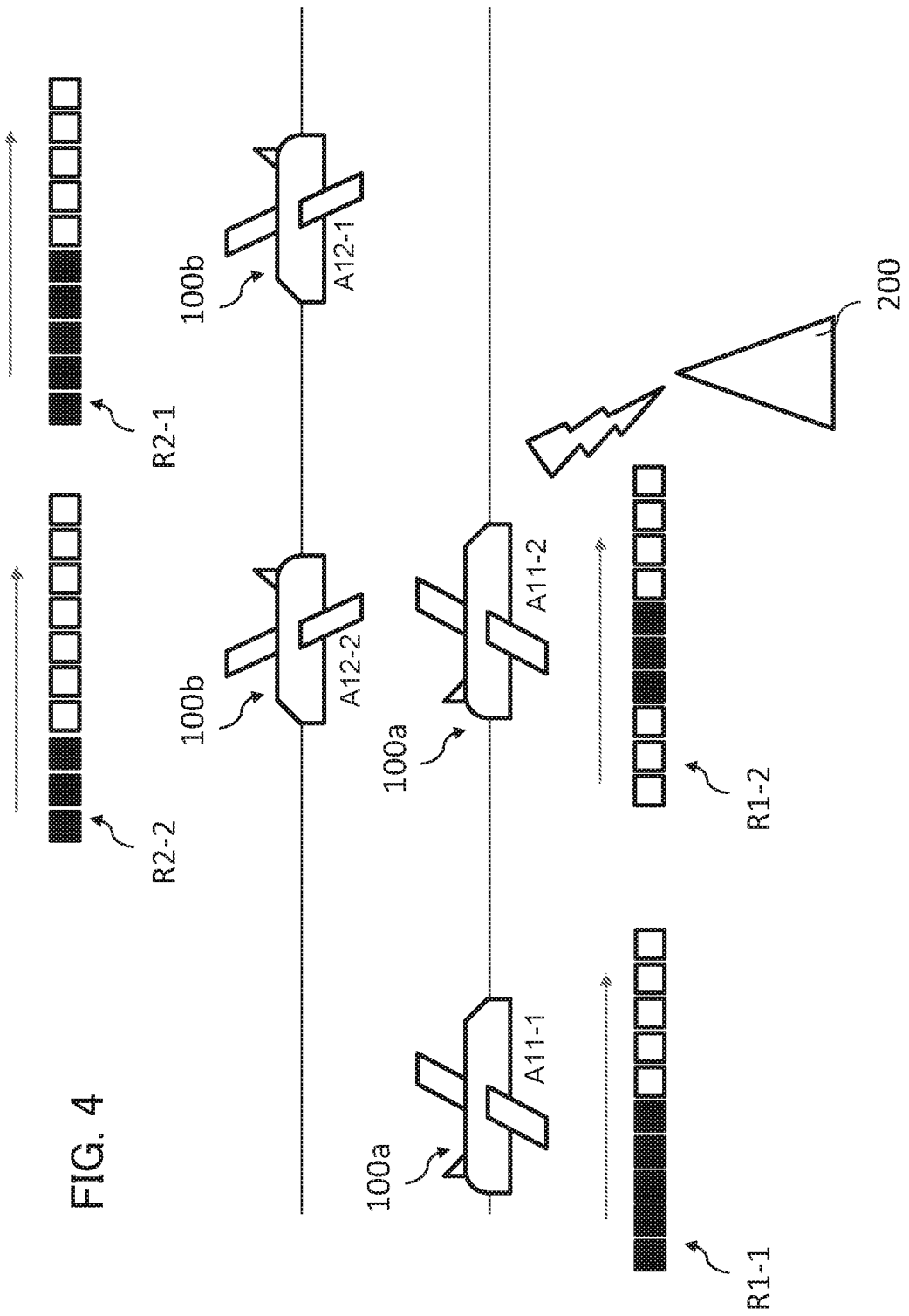
FIG. 4 schematically shows a communication method in Embodiment 1.

One square in FIG. 4 represents a resource block. Black squares represent resource blocks used by aircrafts 100 (100*a* to 100*c*) and base stations 200*a* to 200*c* illustrated in FIG. 1.

Frequency hopping is made to each resource block for each time slot, and therefore, even if an interference signal exists in a certain resource block, the effect can be limited to a part of the communication during the communication period. Further, since communication is performed using a different switching pattern between another aircraft and the base station, interference during the communication link is randomized.

Here, it is possible to reduce the effect of interference by applying an error-correcting code over a plurality of resource blocks, Note that an error-correcting code may be applied at the physical layer or a higher layer such as the application layer, as long as the error-correcting code is applied with a length covering a plurality of resource blocks.

Using the frequency hopping scheme can reduce the effect of co-channel interference (CCI), but limits the number of resource blocks that can be used in one time slot. For this reason, if there is no aircraft and base station communicating with each other in the vicinity and there is no CCI, performing frequency hopping reduces the band use efficiency.

Considering that the navigation route of aircraft is determined in advance by its flight schedule, when the aircraft is flying at a certain location, it is possible to forecast the number of other aircrafts communicating in the vicinity and the base station communicating with the aircrafts.

<Dynamic Allocation of Resource Blocks>

The dynamic allocation of resource blocks will be described with reference to FIG. 4.

FIG. 4 shows that the aircraft 100a moves from the location A11-1 to the location A11-2, and the aircraft 100b moves from the location A12-1 to the location A12-2. The location A11-2 and A12-2 indicate that the aircraft 100a and the aircraft 100b are on nearby routes at a certain time.

The distance between the location A11-2 and the location A12-2 is short, and CCI occurs between the aircraft 100a at the location A11-2 and the aircraft 100b at the location A12-2. On the other hand, the distance between A11-1 and A12-2 and the distance between A12-1 and A11-2 are sufficiently long. Therefore, no CCI occurs, for example, between the aircraft 100a at the location A11-2 and the aircraft 100b at the location A12-1.

R1-1, R1-2, R2-1, and R2-2 indicate the allocation patterns (switching patterns) of resource blocks both used and not used by the aircrafts and the base station at the locations. One square represents a resource block, and a black square is a resource block to be used. The white squares are resource blocks that are not to be used. The direction of the arrows indicate the height of the frequency.

When the aircraft 100a is at the location A11-2 and the aircraft 100b is at the location A12-2, CCI occurs because the aircraft 100a and the aircraft 100b are too close to each other. In this case, the aircraft 100a adopts the switching pattern R1-2 of the resource blocks, and the aircraft 100b adopts the switching pattern R2-2, whereby occurrence of CCI can be avoided.

Although FIG. 4 shows only one base station 200, the locations A11-1, 11-2, A12-1, and A12-2 may be included in a communication area covered by a number of base stations.

FIG. 5 shows a relation table T1 between the location information of the aircraft 100 and the switching patterns of the resource blocks. For example, when the aircraft 100 is at the location A11-1, the resource block switching pattern R1-1 is selected.

As illustrated in FIG. 5, a relation table T1 between the location of the aircraft and the switching patterns of the resource blocks is prepared in advance, and the on-aircraft communication device 300 and the on-base-station communication device 400 keep the table in advance as common switching patterns.

The aircraft 100 transmits its own flight location to the base station 200, refers to the relation table T1, selects a switching pattern to use, and starts communication based on the selected switching pattern. For example, the encoder 313 of the on-aircraft communication device 300 encodes location information acquired from the location information acquisition unit 318 of the aircraft 100. The transmitter 312 transmits the encoded location information through the antenna 311. Further, the antenna 421 of the on-base-station communication device 400 receives the encoded location information, and the decoder 425 performs decoding on the received location information. Upon receiving the location information, the communication controller 426 selects a switching pattern based on the relation table T1 illustrated in FIG. 5.

In this way, by acquiring location information, it is possible to grasp in advance that there is no aircraft communicating with the base station in the vicinity, and therefore, it is possible to use hopping patterns using more resource blocks than in a normal radio communication. Consequently, the bands can be used more efficiency. Also, when there are many aircrafts communicating with the base station in the vicinity, the number of resource blocks used in one time slot can be reduced, and hopping patterns longer in the time axis direction can be used, which can reduce the effect of CCI.

1-2. Operation

Radio communication between the on-aircraft communication device 300 and the on-base-station communication device 400 will be described with reference to FIG. 6.

The communication devices 300 and 400 execute start processing (S11, S21). The on-aircraft communication device 300 acquires its own location information from the location information acquisition unit 318 (S12). In this case, the location information may be acquired from a flight schedule, or may be location information that can be dynamically acquired by the aircraft using GPS communication. The switching pattern acquisition unit 317 refers to the information in the switching pattern storage 331. The communication controller 316 selects a switching pattern corresponding to the location information (S13). The selected switching pattern and the location information are encoded and transmitted (S14).

The on-base-station communication device 400 receives the encoded switching pattern and location information via the receiver 424 (S22). The decoder 425 decodes the encoded switching pattern and location information. The switching pattern acquisition unit 427 refers to the information in the switching pattern storage 431 and selects a corresponding switching pattern (S23). The communication device 400 encodes and transmits data using the selected switching pattern (S24).

The on-aircraft communication device 300 receives the encoded data and decodes it based on the selected switching pattern (S15). Similarly, the communication device 300 encodes and transmits transmission data using the selected switching pattern (S16).

The on-base-station communication device 400 receives the encoded data and decodes it based on the selected switching pattern (S25).

The on-aircraft communication device 300 acquires location information while data is transmitted and received in steps S15, S16, S24, and S25 (S17). The communication controller 316 determines whether there is a change in the location information (S18), and if there is a change, returns to the process of step S13 and selects a switching pattern according to the change.

When the communication ends (Yes in S19 and S26), the communication devices 300, 400 execute end processing (S20, S27). Unless the communication is completed, the processing of steps S15 to S19 and steps S24 to S26 is repeated.

1-3. Effects

In radio communication between an aircraft and a base station, stable radio communication can be provided even in an environment where radio waves from a number of base stations are received and interference due to use of the same frequency occurs. Moreover, since communication resources are allocated according to the location of aircraft, it is possible to suppress a decrease in band use efficiency caused by execution of frequency hopping when CCI does not occur.

1-4. Modified Examples

The on-aircraft communication device 300 may transmit only the location information to the on-base-station communication device 400, and the communication device 400 may determine the switching pattern according to the relation table T1 held or acquired by the communication device 400. In this case, the determined switching pattern is transmitted from the on-base-station communication device 400 to the on-aircraft communication device 300.

Figure 6:
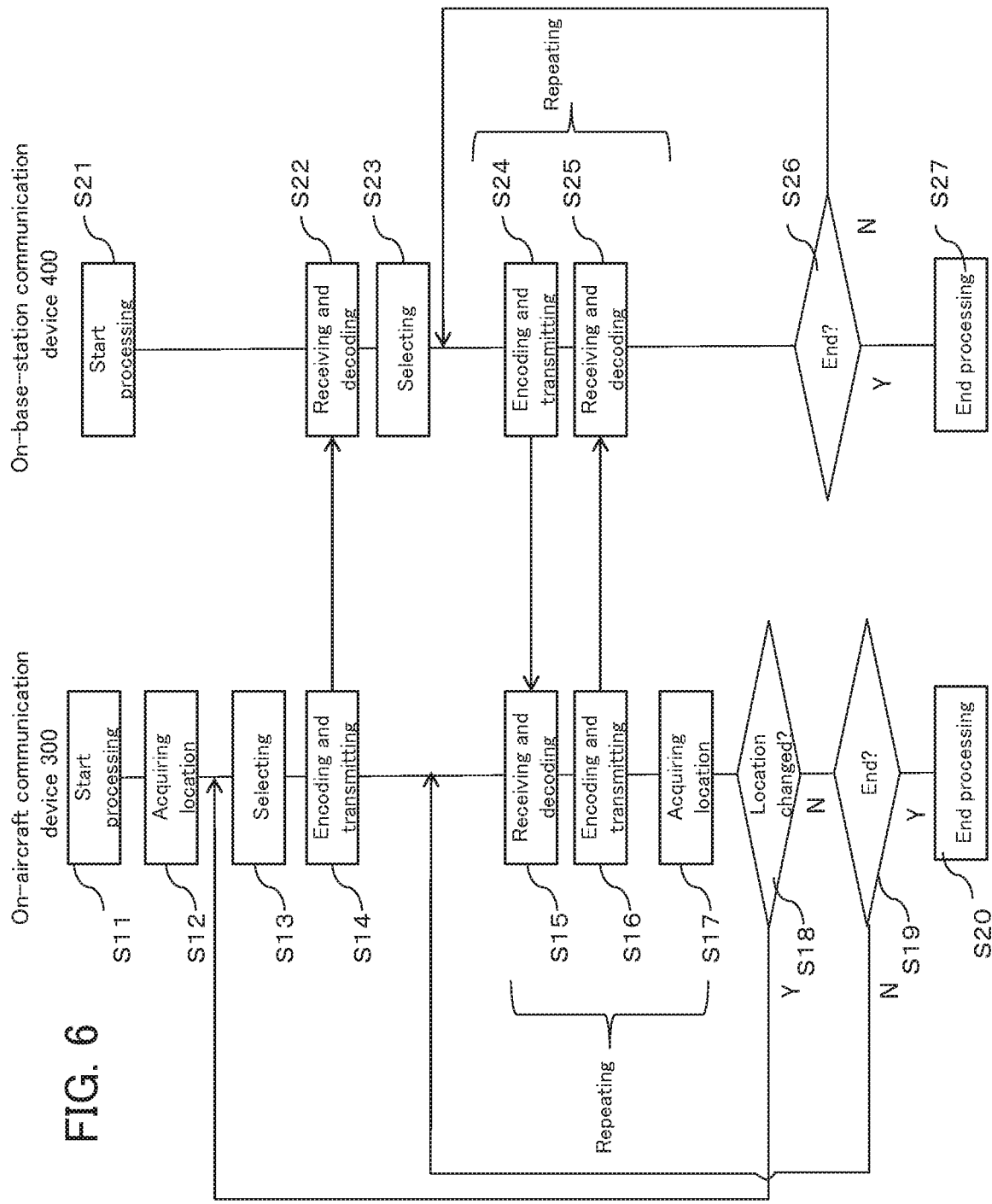
FIG. 6 shows a flowchart of an operation of the communication system according to Embodiment 1.

The on-aircraft communication device 300 does not need to transmit in advance the location information and the information on a switching pattern to the on-base-station communication device 400 as in steps S13 to S14 in FIG. 6. The on-aircraft communication device 300 may transmit a switching pattern to the on-base-station communication device 400 together with data when the data is transmitted using the switching pattern selected by the on-aircraft communication device 300 based on the location information.

The location information and/or switching pattern information are not necessarily transmitted and received between the on-aircraft communication device 300 and the on-base-station communication device 400. Instead, codes corresponding to those pieces of information may be determined in advance, and the code information may be transmitted and received between the communication devices 300 and 400. In this case, the communication devices 300 and 400 each acquire or keep a relation table between the code information and the location information and/or switching pattern information. Moreover, the relation table T1 information itself as illustrated in FIG. may be transmitted and received between the on-aircraft communication device 300 and the on-base-station communication device 400.

Embodiment 2

The communication system according to the present embodiment performs allocation of appropriate communication resources according to a traffic demand that differs between aircrafts in air-to-ground communication (Air-To-Ground-Communication).

Hereinafter, the communication system according to the present embodiment will be described focusing on what differs from the first embodiment.

2-1. Configuration

Figure 7:
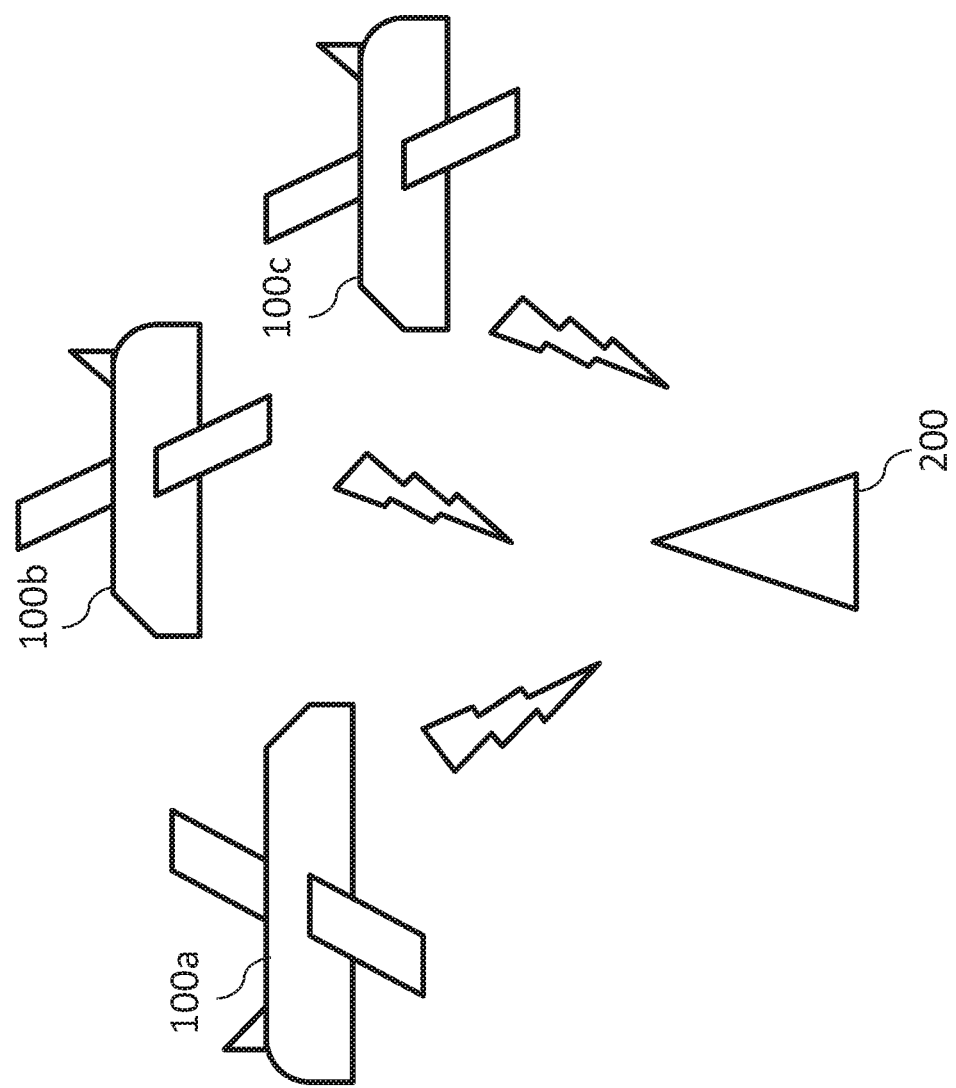
FIG. 7 schematically shows a plurality of aircrafts performing radio communication and a base station on the ground.

As illustrated in FIG. 7, in an air-to-ground communication system in Embodiment 2, a plurality of aircrafts 100*a*, 100*b*, and 100*c* perform radio communication with the base station 200. The aircrafts 100*a*, 100*b*, and 100*c* are connected to and communicate with the base station 200.

Figure 8:
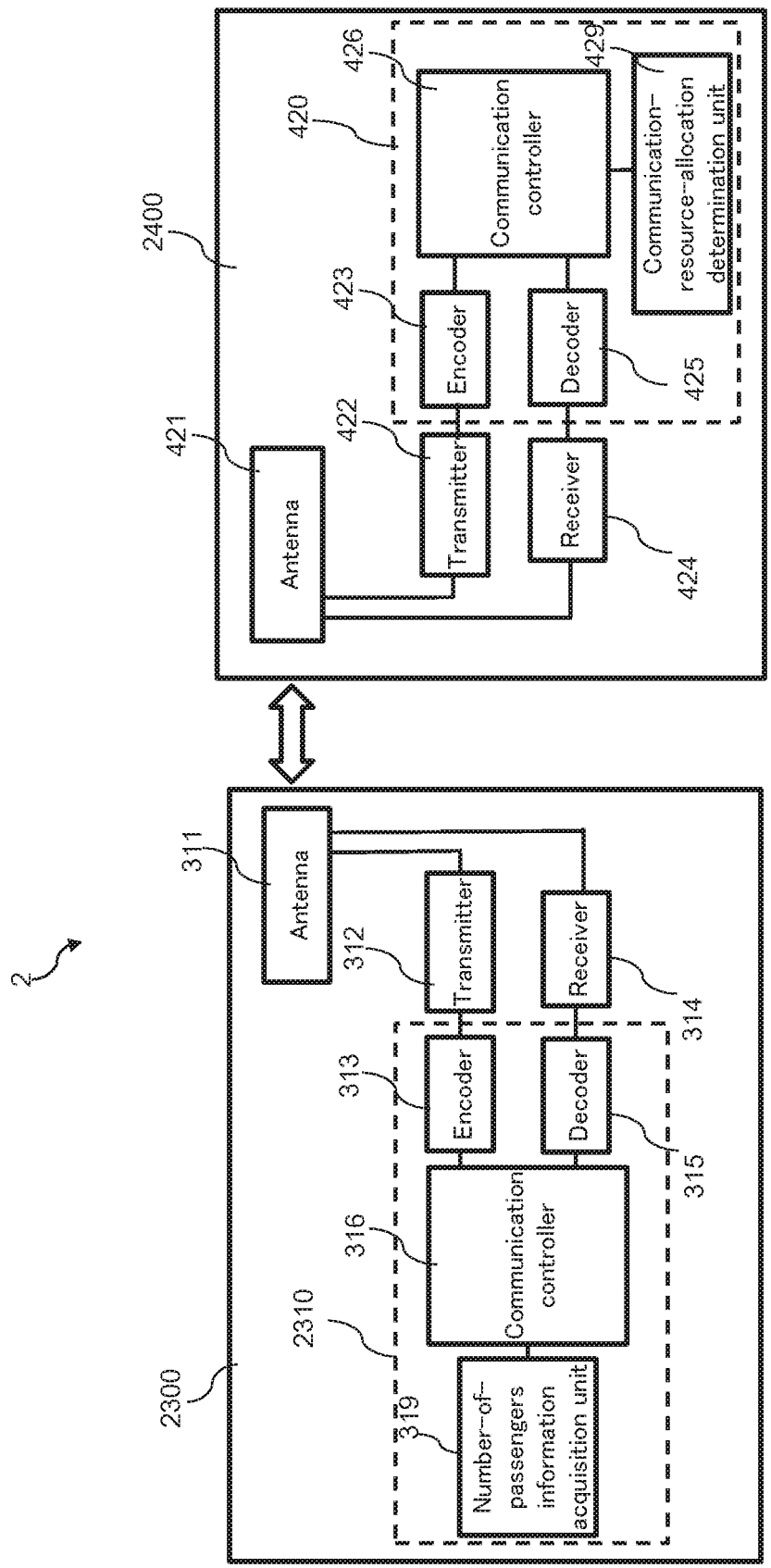
FIG. 8 shows a configuration of a communication system according to Embodiment 2.

FIG. 8 shows a configuration of the communication system 2 according to the present embodiment. The communication system 2 comprises a communication device 2300 installed in the aircraft 100 and a communication device 2400 installed in the base station 200.

The on-aircraft communication device 2300 comprises an antenna 311, a transmitter 312 for transmitting data to the base station, a receiver 314 for receiving data from the base station, and a processor 310. The processor 310 is a processor or circuitry such as a DSP or a CPU, and by executing a predetermined program, implements the functions of an encoder 313, a decoder 315, a communication controller 316, a switching pattern acquisition unit 317, and a number-of-passengers information acquisition unit 319.

The number-of-passengers information acquisition unit 319 acquires number-of-passengers information indicating the maximum number of passengers to board the aircraft.

The on-base-station communication device 2400 has the same configuration as the communication device 400 of Embodiment 1. The communication device 2400 comprises an antenna 421, a transmitter 422 for transmitting data to the aircraft, a receiver 424 for receiving data from the aircraft, and a processor 420. The processor 420 is a processor or circuitry such as a DSP or a CPU, and by executing a predetermined program, implements the functions of an encoder 423, a decoder 425, a communication controller 426, and a communication-resource-allocation determination unit 429.

The communication resources are configured similarly to those of Embodiment 1 illustrated in FIG. 2.

In Embodiment 2, it is assumed that communication resources (resource blocks) are allocated in proportion to the maximum number of passengers to board the aircraft. Returning to FIG. 7, the maximum number of passengers to board the aircraft 100*a*, 100*b*, 100*c* is set to 100*a*: 470, 100*b*: 320, and 100*c*: 200. At this time, the base station 200 acquires information on the maximum number of passengers on each of the aircrafts 100 (100*a* to 100*c*) and allocates proportional communication resources (resource blocks).

For example, the encoder 313 of the on-aircraft communication device 2300 encodes the number-of-passengers information acquired by the number-of-passengers information acquiring unit 319. The transmitter 312 converts the encoded number-of-passengers information into an analog signal and transmits the analog signal through the antenna 311.

On the other hand, the antenna 421 and the receiver 424 of the on-base-station communication device 2400 receive the coded number-of-passengers information and convert it into a digital signal. The decoder 425 decodes the number-of-passengers information. When the communication controller 426 receives the number-of-passengers information from the aircrafts 100*a* to 100*c*, the communication-resource-allocation determination unit 429 determines allocation patterns of the communication resources.

Note that the maximum number of passengers on the aircraft may be transmitted from the aircraft to the base station 200 in real time, or may be managed with a table or the like in which a terminal ID for the aircraft is associated with the maximum number of passengers in advance.

Figure 9:
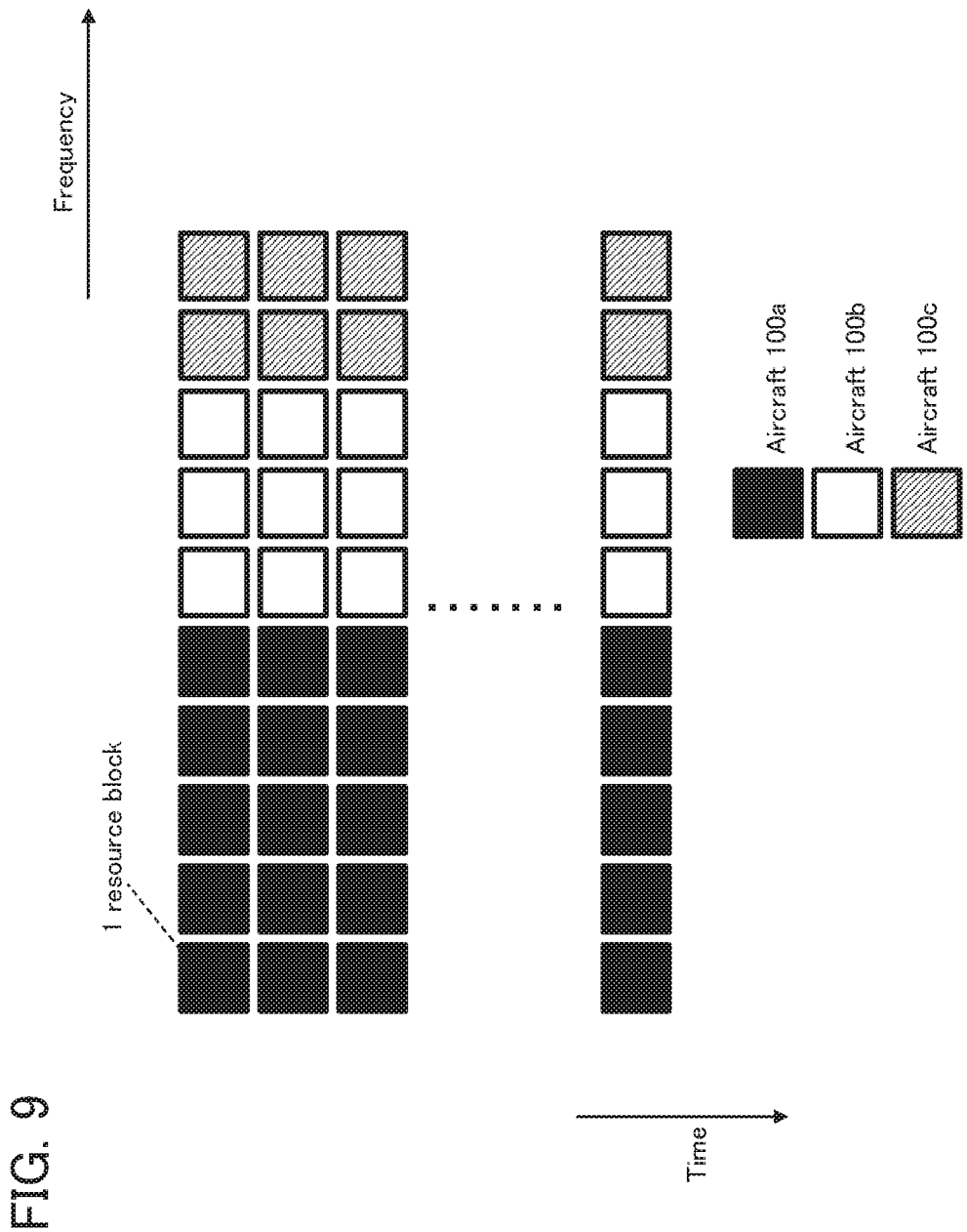
FIG. 9 schematically shows an example of a communication method in Embodiment 2.

FIG. 9 is an explanatory diagram of allocation of communication resources in Embodiment 2. For simplicity, it is assumed that the number of blocks in the frequency axis direction is 10. As illustrated in FIG. 9, communication resources are allocated according to the frequency axis. That is, based on the maximum number of passengers that are aircraft 100*a*:470, aircraft 100*b*:320, and aircraft 100*c*:200, subcarriers that are communication resources on the frequency axis are allocated with the ratios of aircraft 100*a*: 5, aircraft 100*b*: 3, and aircraft 100*c*: 2. With this communication resource allocation, efficient communication resource allocation according to traffic can be achieved.

Figure 10:
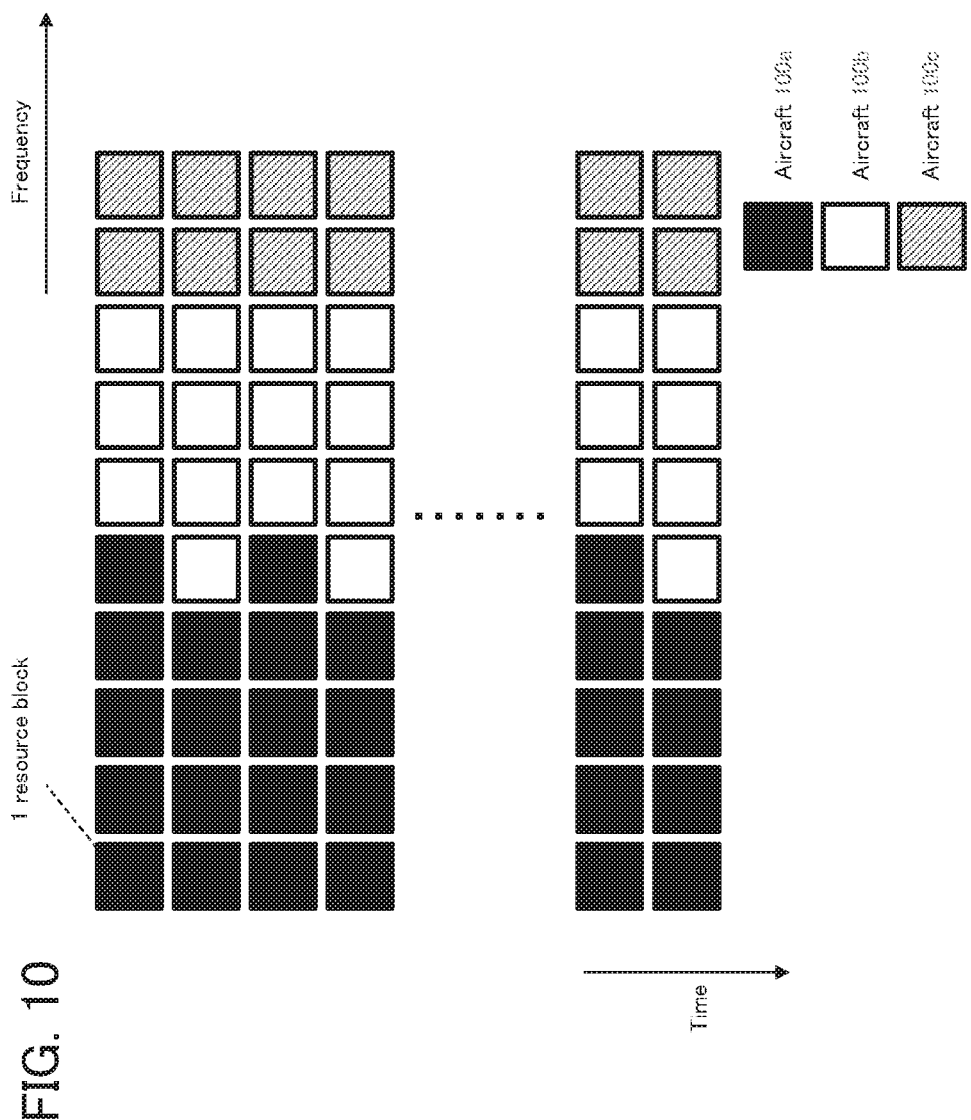
FIG. 10 schematically shows another example of the communication method in Embodiment 2.

FIG. 10 shows another example of allocation of communication resources in the embodiment 2. As in FIG. 9, for simplicity, it is assumed that the number of blocks in the frequency axis direction is set to 10. The allocation of communication resources in FIG. 10 includes resource allocation not only on the frequency axis but also on the time axis. That is, based on the maximum number of passengers that are aircraft 100a:470, aircraft 100b:320, and aircraft 100c:200, subcarriers that are communication resources on the frequency axis are initially allocated with ratios of aircraft 100a:5, aircraft 100b:3, and aircraft 100c:2 in the first time slot. Next, in the second time slot, subcarriers that are communication resources on the frequency axis are allocated with ratios of aircraft 100a:4, aircraft 100b:4, and aircraft 100c:2. The allocation in the first time slot and the allocation in the second time slot are executed alternately.

In FIG. 9, the communication resource allocation is 5:3:2, but in FIG. 10, the communication resource allocation is 4.5:3.5:2, which is more proportional to the communication traffic (the maximum number of passengers). Consequently, efficient communication resource allocation can be achieved.

Although communication resources are assumed to be resources along the frequency axis and the time axis, other communication resources can be similarly allocated in proportion to the maximum number of passengers on aircraft. Such other communication resources can include, for example, a code resource allocation in CDMA (Code Division Multiple Access).

Other than the maximum number of passengers on aircraft, the following may be considered as data based on which the allocation of communication resources is determined, that is, communication traffic determination information for determining the use of radio communication in aircraft. For example, it can be assumed to use (1) size information (length, weight) of aircraft, (2) the actual number of passengers on aircraft, (3) the actual number of users of radio communication in aircraft, and the like. Regarding (1), if the maximum number of passengers on aircraft is not known, size information such as length and weight of the aircraft may be used instead. Regarding (2), if the actual number of passengers in aircraft is known from data from an airline or the like, communication resources can be allocated more efficiently based on the actual number of passengers. Regarding (3), if the number of prospective radio communication users in aircraft can be specified, more efficient communication can be performed by allocating resources according to the number of prospective radio communication users. In addition, it is also possible to determine the number of users of radio communication from the number of connections such as WiFi in aircraft, transmit the number of users to the on-base-station, and allocate communication resources based on the information of the number of connections. In this case, since the number of connections changes with time, the on-aircraft communication device 2300 may transmit information on the number of connections to the on-base-station communication device 2400 at predetermined time intervals, whereby the communication device 2400 determines a change in the number of connections and changes the allocation of communication resources accordingly. In addition, the communication traffic determination information may include charging information or contracts for communication use by airlines. Depending on such information, communication resources may be preferentially allocated to an aircraft.

2-2. Operation

Figure 11:
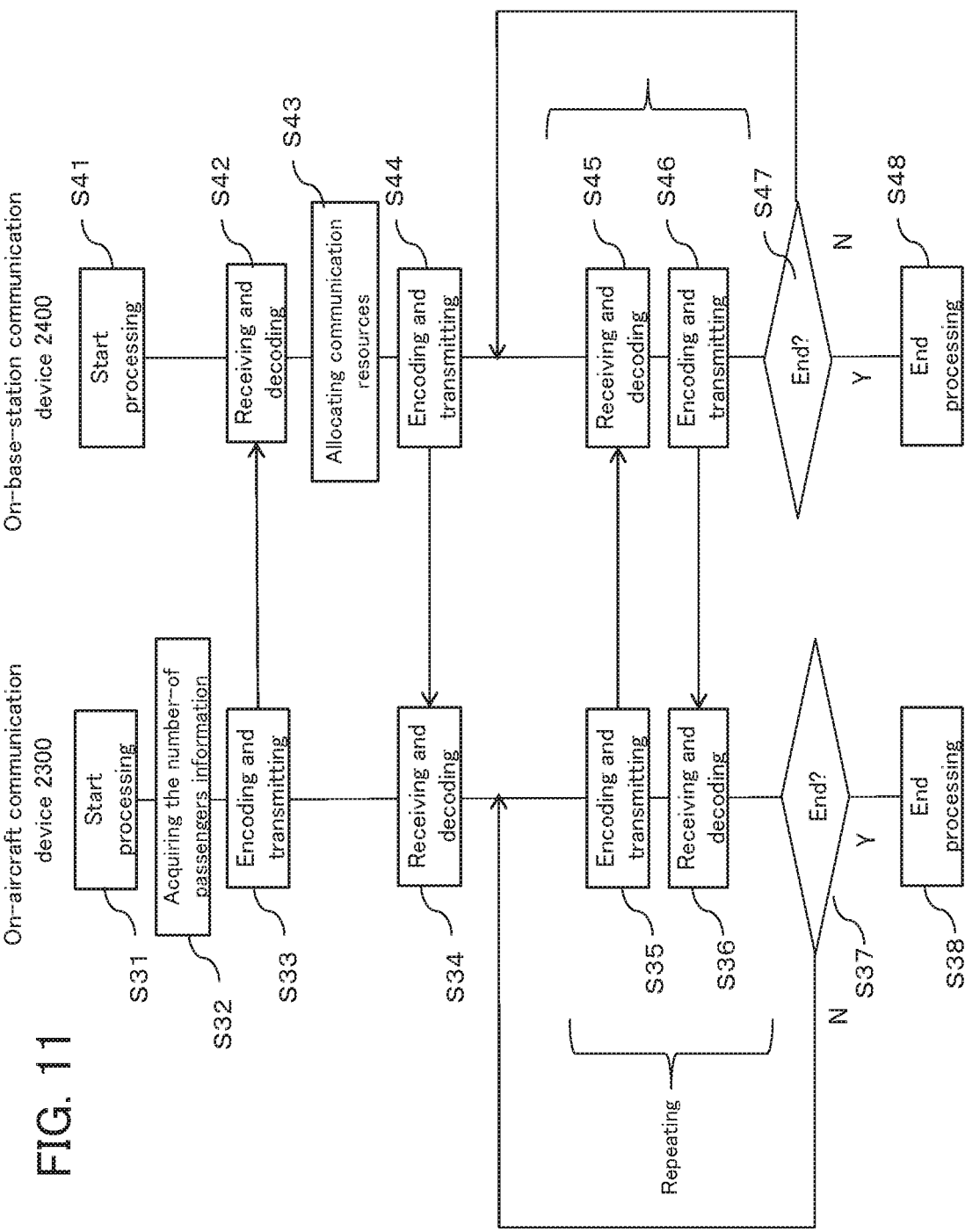
FIG. 11 shows a flowchart of an operation of the communication system according to Embodiment 2.

With reference to FIG. 11, communication between the on-aircraft communication device 2300 and the on-base-station communication device 2400 will be described.

The communication devices 2300 and 2400 start processing (S31, S41). The on-aircraft communication device 2300 acquires the number-of-passengers information indicating the maximum number of passengers from the number-of-passengers information acquisition unit 319 (S32). The encoder 313 encodes the number-of-passengers information, and transmits the encoded information by the transmitter 312 (S33).

The on-base-station communication device 2400 receives the coded number-of-passengers information via the receiver 424. The decoder 425 decodes the encoded number-of-passengers information (S42). The communication-resource-allocation determination unit 429 determines the allocation of communication resources according to the number-of-passengers information (S43). The allocation of communication resources is determined by, for example, the method as illustrated in FIG. 9 or FIG. 10. The decoder 425 encodes the determined communication-resource-allocation information, and transmits the information via the transmitter 422 (S44).

The on-aircraft communication device 2300 receives and decodes the encoded communication-resource-allocation information, and stores the information in memory.

The on-aircraft communication device 2300 receives encoded data and decodes it based on the acquired communication-resource-allocation information (S34). Similarly, the communication device 2300 encodes and transmits transmission data based on the acquired communication-resource-allocation information (S35).

The on-base-station communication device 2400 receives encoded data and decodes the data based on the determined communication-resource-allocation information (S45). Similarly, the communication device 2400 encodes and transmits transmission data based on the acquired communication-resource-allocation information (S46).

Data transmission and reception are performed in steps S35, S36, S45, and S46.

When the communication ends (Yes in S37 and S47), the communication devices 2300, 2400 execute end processing (S38, S48). Unless the communication is completed, the processing of steps S35 to S37 and steps S45 to S47 is repeated.

In the example of FIG. 11, in a case where the communication traffic determination information changes with time, for example, in a case where the number of passengers in each aircraft and the number of radio communication connections in each aircraft are used as the communication traffic determination information, a determination may be made on whether there is a change in the communication traffic determination information and according to the change, the allocation patterns of the communication resources may be changed.

2-3. Effect

In air-to-ground communication, communication resources are allocated according to the actual traffic in an aircraft, and therefore, the communication system can be operated efficiently.

2-4. Modified Examples

The on-base-station communication device 2400 can keep in advance communication traffic determination information such as the maximum number of passengers on each aircraft, the size of each aircraft, the number of passengers in each aircraft, the number of prospective users to use radio communication in each aircraft, the number of wireless connections in each aircraft, and contract information and charging information with the owner of each aircraft. In this case, an allocation pattern of communication resources is determined for each aircraft according to the kept communication traffic determination information, and communication with each aircraft is performed according to the allocation pattern.

Other Embodiment

As described above, embodiments have been described as examples of the technology in the present disclosure. For that purpose, the accompanying drawings and the detailed description have been provided.

Accordingly, the components described in the accompanying drawings and the detailed description can include not only those components that are essential for solving the problem, but also those that are not essential for solving the problem in order to illustrate the examples of the technology. Therefore, those non-essential components should not be readily considered as essential only because the non-essential components are described in the accompanying drawings and the detailed description.

Since the above-mentioned embodiments aim to exemplify the technology in the present disclosure, various changes, replacements, additions, omissions, and the like can be made in the scope of the claims or the equivalents thereof.

Part or all of the processing of each functional block in each of the above embodiments may be implemented by a program. Further, the processor or circuit may be single or plural.

The present disclosure can include a communication method for implementing the communication device or the communication system of each of the above embodiments. The order for carrying out the communication methods in the above-mentioned embodiments is not necessarily limited to what is described in the above embodiments. The order can be changed or processes can be executed in parallel, without departing from the gist of the invention.

REFERENCE NUMERALS

1: Communication system
2: Communication system
100: Aircraft
100a: Aircraft
100b: Aircraft
100c: Aircraft
200: Base station
200a: Base station
200b: Base station
200c: Base station
300: On-aircraft communication device
310: Processor
311: Antenna
312: Transmitter
313: Encoder
314: Receiver
315: Decoder
316: Communication controller
317: Switching pattern acquisition unit
318: Location information acquisition unit
319: Number-of-passengers information acquisition unit
331: Switching pattern storage
332: Location information storage
400: On-base-station communication device
420: Processor
421: Antenna
422: Transmitter
423: Encoder
424: Receiver
425: Decoder
426: Communication controller
427: Switching pattern acquisition unit
429: Communication-resource-allocation determination unit
431: Switching pattern storage
2300: On-aircraft communication device
2400: On-base-station communication device

The invention claimed is:

1. A communication device configured to be installed in an aircraft and configured to perform radio communication with a base station on the ground, the communication device comprising:
a transmitter;
a receiver, and
a controller configured to acquire location information of the aircraft at a predetermined time, the controller configured to communicate with the base station using an allocation pattern of communication resources according to the location information of the aircraft,
wherein the controller is configured to acquire a plurality of allocation patterns of communication resources, select one of the plurality of allocation patterns of communication resources according to the location information of the aircraft, and communicate with the base station using the selected allocation pattern, and
wherein less communication resources are allocated for the allocation pattern as the aircraft is closer to another aircraft according to the location information.

2. The communication device according to claim 1, wherein the controller is configured to acquire the allocation pattern from the base station and communicate with the base station using the acquired allocation pattern.

3. The communication device according to claim 1, wherein the controller is configured to determine whether the location information has been changed, and change the allocation pattern according to the change.

4. The communication device according to claim 1, wherein the communication resources includes a plurality of resource blocks, each of the resource blocks includes a plurality of adjacent subcarriers in a predetermined unit of frequency and a predetermined time slot.

5. A communication system comprising:
the communication device according to claim 1; and
another communication device configured to be installed in the base station, the another communication device being configured to communicate with the communication device using the allocation pattern.

6. A communication method for controlling radio communication between an aircraft and a base station on the ground, the communication method including:
acquiring location information of the aircraft at a predetermined time;
acquiring an allocation pattern of communication resources according to the location information of the aircraft;
performing communication with the base station using the allocation pattern;
acquiring a plurality of allocation patterns of communication resources;

selecting one of the plurality of allocation patterns of communication resources according to the location information of the aircraft; and communicating with the base station using the selected allocation pattern, and wherein less communication resources are allocated for the allocation pattern as the aircraft is closer to another aircraft according to the location information.

\* \* \* \* \*